United States Patent
Sonst

(10) Patent No.: US 10,942,927 B2
(45) Date of Patent: Mar. 9, 2021

(54) SUBSCRIPTION HANDLING AND IN-MEMORY ALIGNMENT OF UNSYNCHRONIZED REAL-TIME DATA STREAMS

(71) Applicant: Siemens Aktiengesellschaft, Munich (DE)

(72) Inventor: Michael Sonst, Alpharetta, GA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/608,225

(22) PCT Filed: May 4, 2017

(86) PCT No.: PCT/US2017/031050
§ 371 (c)(1),
(2) Date: Oct. 25, 2019

(87) PCT Pub. No.: WO2018/203905
PCT Pub. Date: Nov. 8, 2018

(65) Prior Publication Data
US 2020/0192902 A1  Jun. 18, 2020

(51) Int. Cl.
*G06F 16/2455* (2019.01)
*G06F 16/22* (2019.01)
(Continued)

(52) U.S. Cl.
CPC ........ *G06F 16/24568* (2019.01); *G06F 8/458* (2013.01); *G06F 16/22* (2019.01); *G06F 16/951* (2019.01)

(58) Field of Classification Search
None
See application file for complete search history.

(56) References Cited

U.S. PATENT DOCUMENTS 5,333,299 A    7/1994  Koval et al.
5,649,208 A *  7/1997  Intrater ............... G06F 9/30167
                                                      710/262
(Continued)

FOREIGN PATENT DOCUMENTS

EP    0827656 A2    3/1998

OTHER PUBLICATIONS

PCT International Search Report and Written Opinion of International Searching Authority dated Jun. 27, 2017 corresponding to PCT International Application No. PCT/US2017/031050 filed May 4, 2017.

*Primary Examiner* — Ashish Thomas
*Assistant Examiner* — Mellissa M. Ohba

(57) ABSTRACT

Methods for subscription handling and in-memory alignment of unsynchronized real-time data streams. A method (500) includes receiving a subscription (631) containing a signal identifier (626), and unsynchronized data (640). The method also includes detecting if the unsynchronized data for an actual time of measurement (ATM) timestamp (615) has completely arrived, and aligning (505) the unsynchronized data in predefined time slots (610). The method further includes filling (510) in data gaps (805) in the unsynchronized data for the ATM timestamp, and handling (520) the subscription using values (642) from the unsynchronized data for the ATM timestamp, and performing (515) memory protection when the subscription is handling inefficiently.

20 Claims, 9 Drawing Sheets

(51) Int. Cl.
*G06F 16/951* (2019.01)
*G06F 8/41* (2018.01)

(56) References Cited

U.S. PATENT DOCUMENTS

| | | |
|---|---|---|
| 2003/0070012 A1 | 4/2003 | Cota-Robles et al. |
| 2013/0083753 A1* | 4/2013 | Lee .................. H04W 72/0453 |
| | | 370/329 |
| 2013/0210421 A1* | 8/2013 | Mohseni ............... H04L 1/1867 |
| | | 455/423 |
| 2019/0385057 A1* | 12/2019 | Litichever ................ G06N 3/08 |
| 2020/0022067 A1* | 1/2020 | Pan ....................... H04W 48/14 |
| 2020/0092859 A1* | 3/2020 | Dinan ..................... H04L 5/001 |

* cited by examiner

FIG. 4
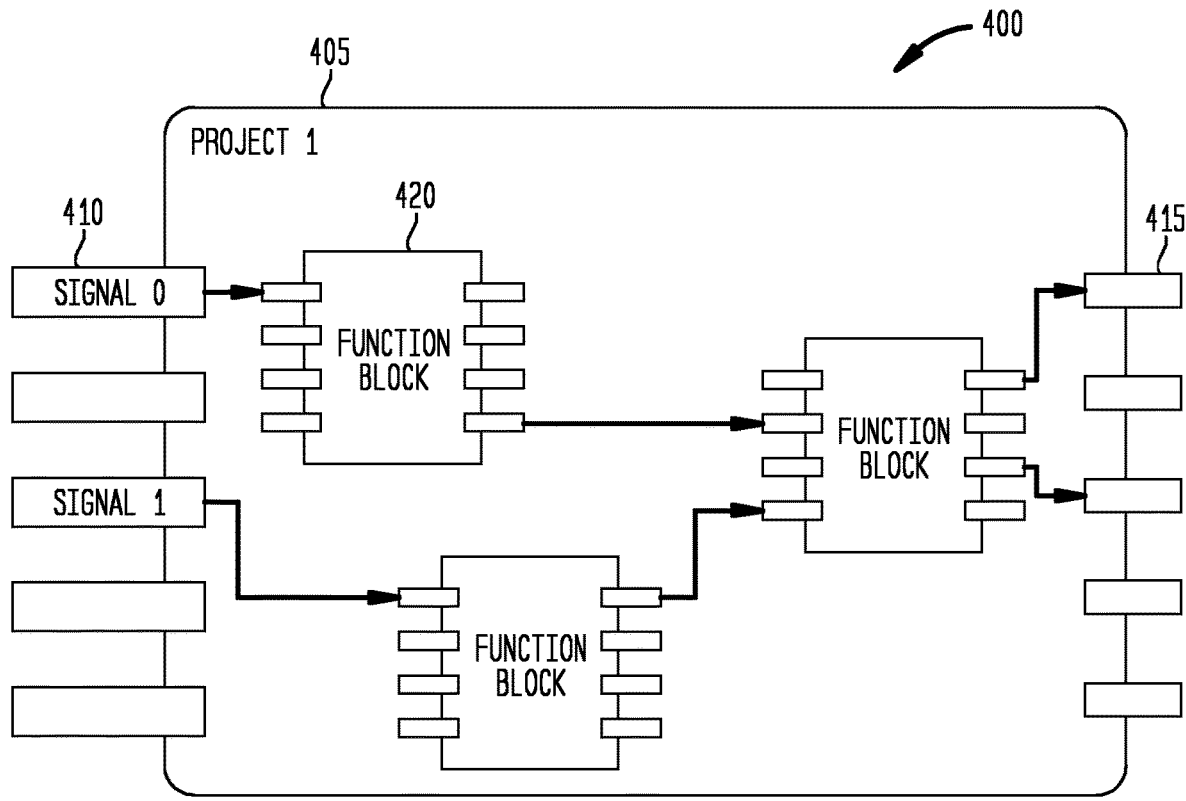
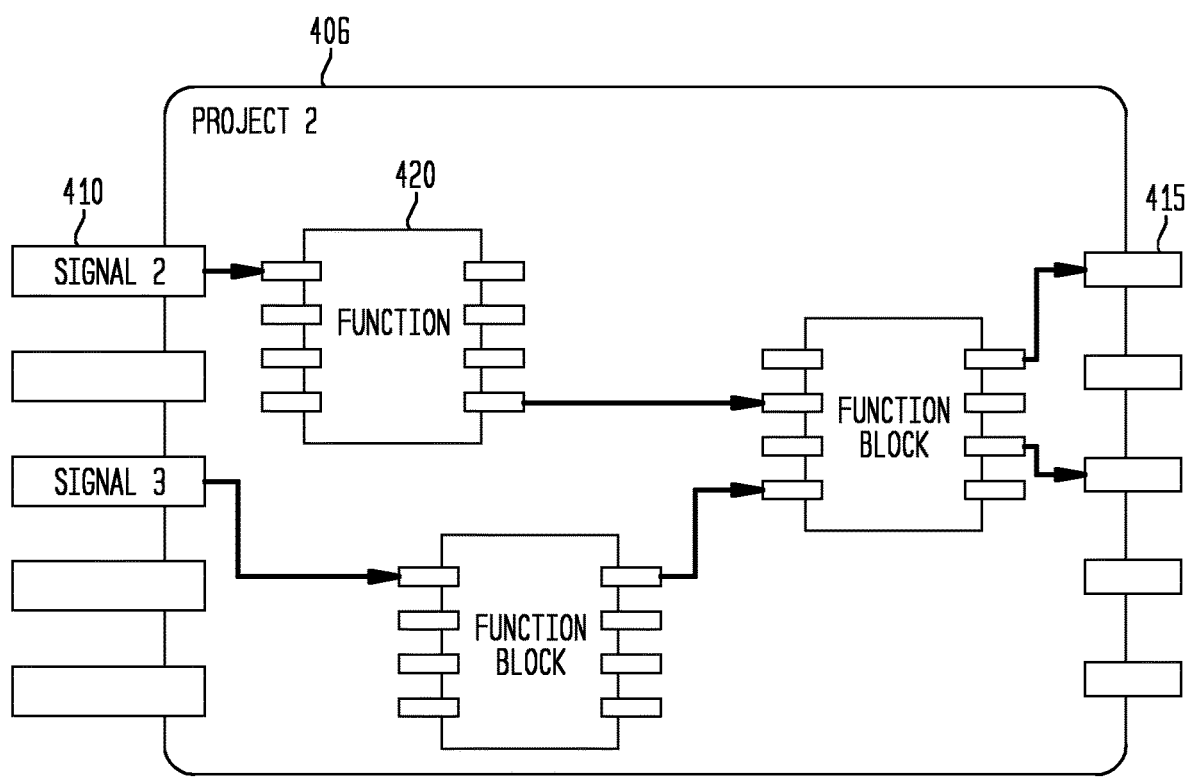

SUBSCRIPTION HANDLING AND IN-MEMORY ALIGNMENT OF UNSYNCHRONIZED REAL-TIME DATA STREAMS

TECHNICAL FIELD

The present disclosure is directed, in general, to data synchronization and more particularly to a system and method for subscription handling and in-memory alignment of unsynchronized real-time data streams.

BACKGROUND OF THE DISCLOSURE

Global industrial sites (power plants, manufacturing lines, etc.) have local (on site) automation systems installed, capable of controlling the physical aspects for transforming an incoming material flow into various kinds of outputs.

During this transformation various in-field measurements provide insights into the process and can be used for further analysis, such as lifetime prediction and deviation detection. Analytical applications acquire this data and allow customers to build analytical models basing on this data to monitor assets and to derive actions. The required signals used to process these analytical models can be seen as subscriptions to the described system. The application is usually installed in a remote diagnostic center (RDC), or in the cloud operated by an RDC, where assets of different sites are monitored.

SUMMARY OF THE DISCLOSURE

Various disclosed embodiments include methods for subscription handling and in-memory alignment of unsynchronized real-time data streams. A method includes receiving a subscription containing a signal identifier, and unsynchronized data. The method also includes detecting if the unsynchronized data for an actual time of measurement (ATM) timestamp has completely arrived, and aligning the unsynchronized data in predefined time slots. The method further includes filling in data gaps in the unsynchronized data for the ATM timestamp, and handling the subscription using values from the unsynchronized data for the ATM timestamp, and performing memory protection when the subscription is handling inefficiently.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4 illustrates an exemplary topology for analytical projects according to the various embodiments of the present disclosure;

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Data can be aligned using a list of rows sorted by a timestamp and inserted into correct rows after determining which row contains the data for a particular timestamp. The search for the correct row is undeterministic regarding the time required to find the correct row. The time required to find the row depends on the amount of data already stored in the list.

The upload data is stored in a database and an application runs once a day to calculate the results of the analytical models (batch operation). For example, a one day delay exists between the actual issue and the detection by the application. Applications use a dead band interpolation for latching, where all the values are latched. As soon as a new value arrives, the execution is triggered to execute an analytical model to calculate the result in streaming or real-time. Any jitter, wrong, or intermediate results are calculated between two values with the same actual time of measurement (ATM) and different time of arrival (TA). Due to the intermediate execution, where the subscription input vector (SIV) changes value by value and all value have the same ATM, additional workload equaling CPU and RAM resource usage for handling the subscription is created. Value of an older ATM than the value already stored in the latch are rejected. Even when the value is actually filling a "gap" in the past, the subscription is not handled again.

Advantages of the embodiments of the present disclosure include: In-memory alignment of different, unsynchronized real-time data sources; deterministic value insertion and subscription handling; deterministic, minimal memory footprint; eventual execution; fast subscription movement (applying different SIVs); independent subscription movement (subscriptions are unsynchronized); fast check for input completeness; value bucketing (to align data of sites with unsynchronized times) & alignment (provide consistent SIVs for a specific point in time; predictable memory consumption).

Figure 1:
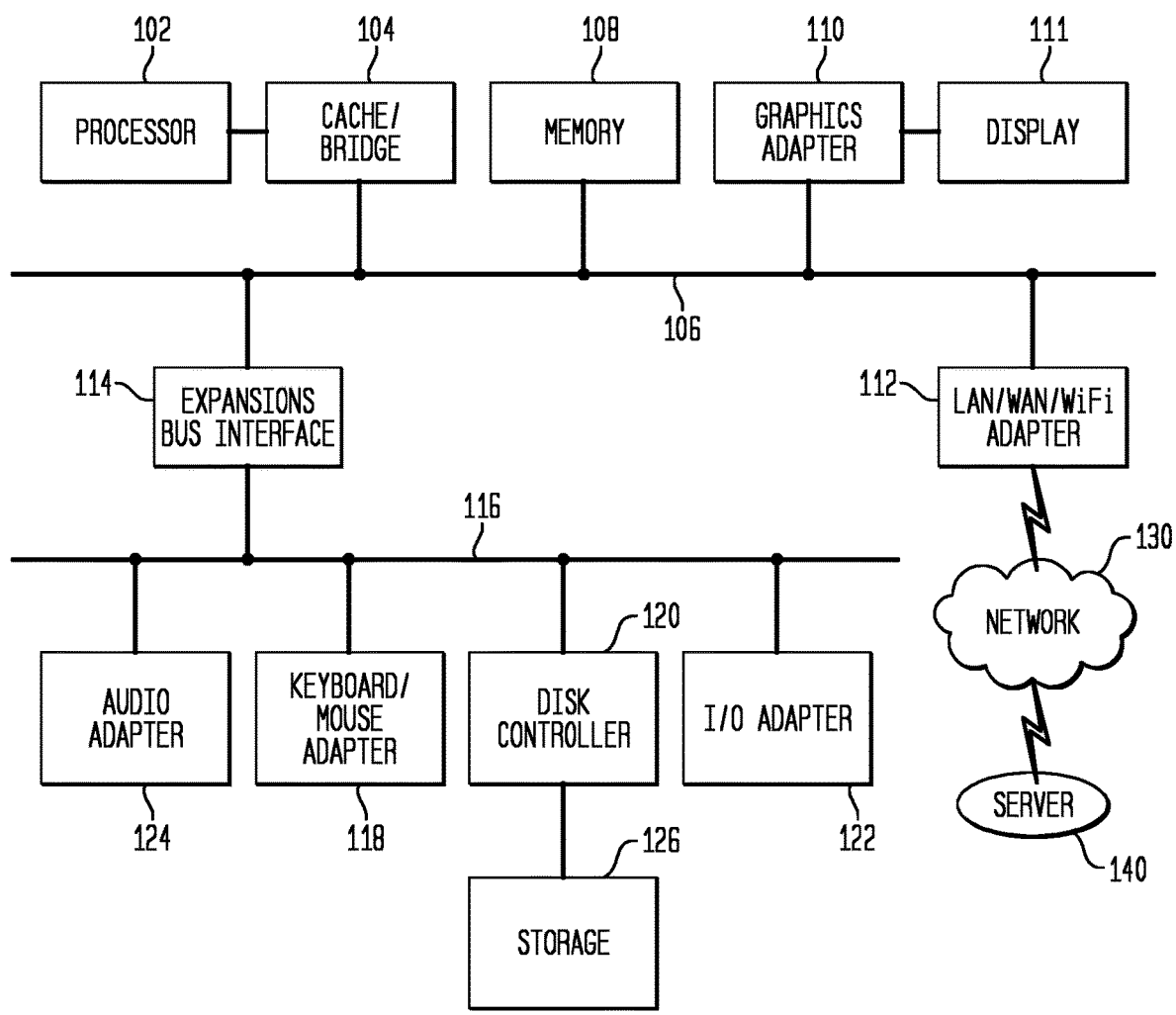
FIG. 1 illustrates a block diagram of a data processing system in which an embodiment can be implemented.

FIG. 1 illustrates a block diagram of a data processing system 100 in which an embodiment can be implemented. The data processing system 100 depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. Wi-Fi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track pointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. or a version of Linux™ may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
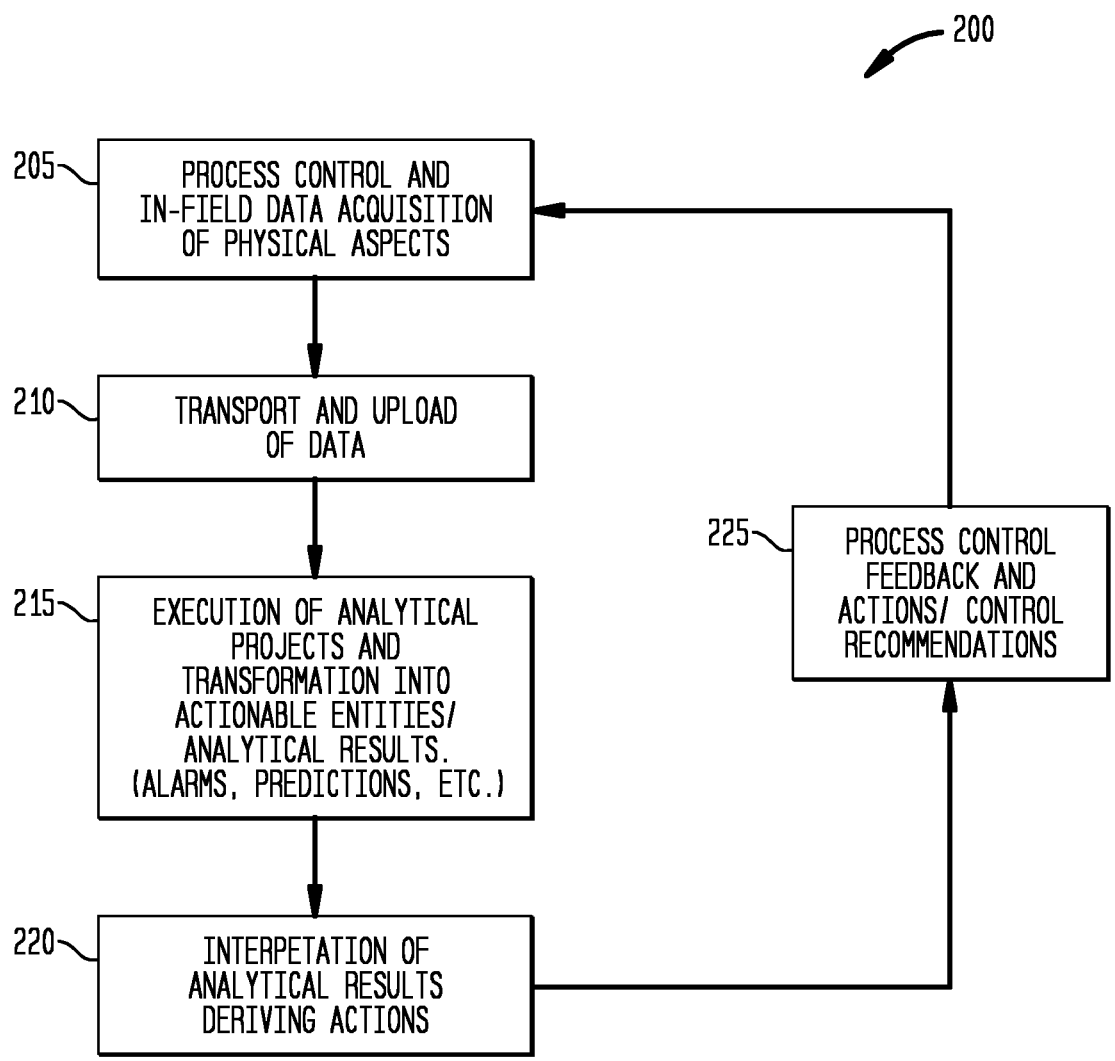
FIG. 2 illustrates an exemplary analytics application flow according to the various embodiments of the present disclosure.

FIG. 2 illustrates an exemplary analytics application flow 200 according to the various embodiments of the present disclosure. For example, the process depicted in FIG. 2 may be performed by a data processing system 100 illustrated in FIG. 1.

In the operations 205-220, an in-field measurement has two timestamps upon arriving at the RDC. The first timestamp is an ATM timestamp. The ATM timestamp is measured or capture at the time that the in-field data for a physical aspect of the systems is acquired. The second timestamp is a TA timestamp for the time when the measurement arrives in the RDC.

In operation 205, the system 100 performs process control and in-field data acquisition of physical aspects of the system 100. When the data is taken from, for example, a sensor, the ATM is captured with the data of the sensor. While the process of a single plant is regularly synchronized by a global positioning system (GPS) synchronized clock, located on-site, different sites between each other may not be synchronized. The GPS synchronization is sent to various participants on-site via network time protocol (NTP) in regular intervals. Subsequently, there can be a drift in time between different sites between the synchronized intervals of the GPS clock. The ATM timestamp is captured at the time of acquisition of the physical aspect of the system.

In operation 210, the system 100 transports and uploads the data acquired in operation 205. The data acquisition and upload to the RDC across different sites may not be synchronized by natures, as the sites might be operated and owned by different individuals/companies. The data uploaders have different upload intervals to move the data to the RDC. The data upload duration varies depending on the type of the data uploaded, internet provider, the connectivity between the sites and the RDC, etc.

In operation 215, the system 100 performs execution of analytical subscriptions and transformation of data into actionable entities and analytical results (alarms, predictions, etc.). For executing analytical subscriptions based on real-time data, a SIV, which comprises all real-world signals used by the subscription and can span different sites, requires all signals to be time synchronized in regards to their ATM to ensure consistent results.

In operation 220, the system 100 interprets the analytical results deriving actions to be performed. In the interpretation of the analytical results, the following requirements are identified for a solution: in-memory alignment of different unsynchronized real-time sources; deterministic value insertion and subscription handling; deterministic; minimal memory footprint; eventual execution using compaction; fast subscription movement (applying different SIVs); independent subscription movement (subscriptions are unsynchronized); fast check for input completeness; and value bucketing to align data of sites with unsynchronized times and alignment to provide consistent SIVs for a specific point in time.

In operation 225, the system 100 feedback process controls and provides action or control recommendations. Controller recommendations include, for example, recommendations to increase the performance and efficiency of asset or protect asset from future failures.

Although FIG. 2 illustrates an example analytics application flow 200, various changes could be made to FIG. 2. For example, while shown in a series of steps, various steps could overlap, occur in parallel, occur in a different order, or occur multiple times.

Figure 3:
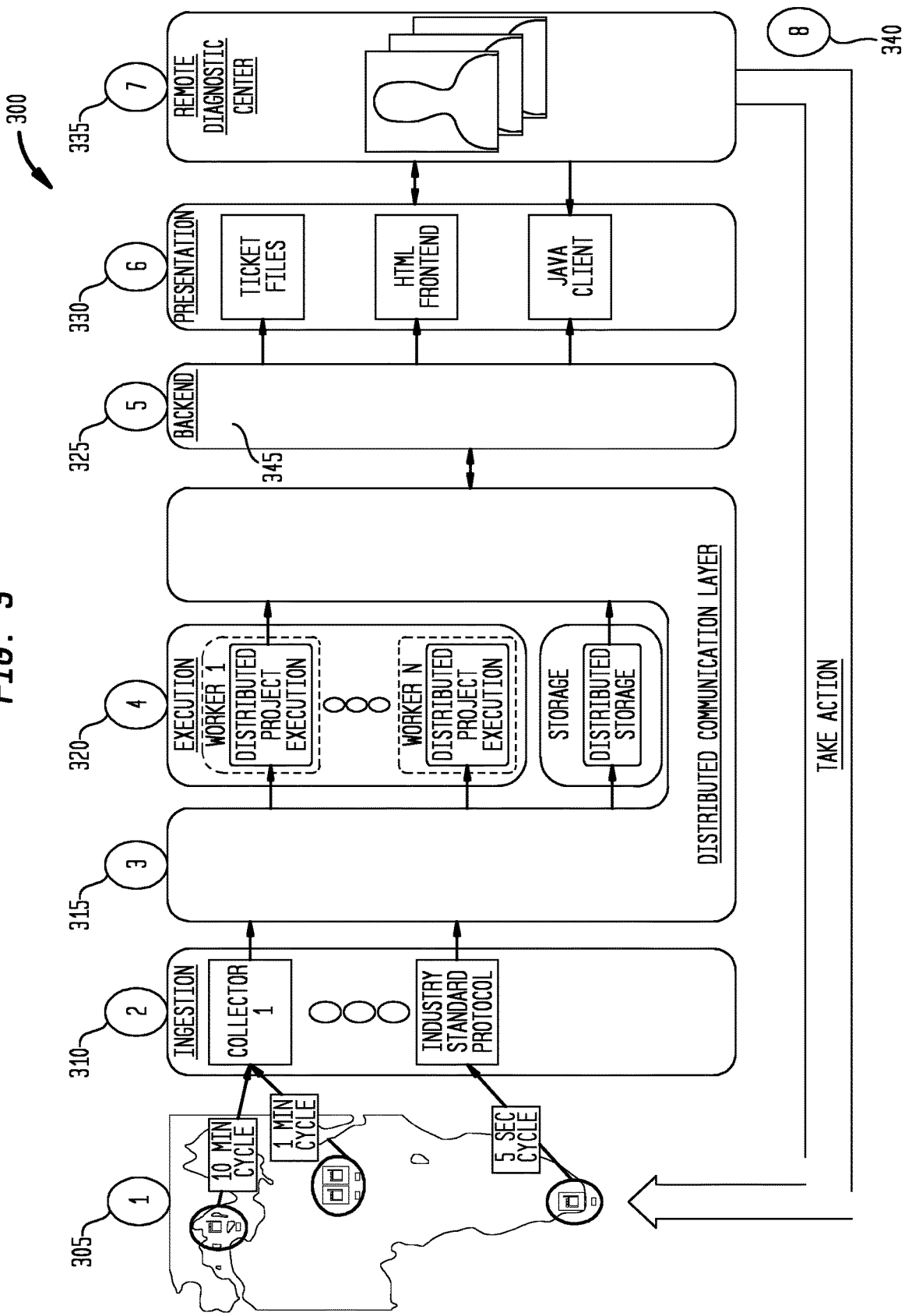
FIG. 3 illustrates an exemplary application overview according to the various embodiments of the present disclosure.

FIG. 3 illustrates an exemplary application overview 300 according to the various embodiments of the present disclosure. For example, the process depicted in FIG. 3 may be performed by a data processing system 100 illustrated in FIG. 1.

The application overview 300 is based completely on horizontally scalable hardware and services. The application overview 300 is designed for real-time data (compared to batch data) to be pushed to the cluster from physical sites all over the world and allows instantaneous notification of engineers in an RDC as well as feedback to on-site operators.

In operation 305, the system 100 acquires in-field data of physical aspects from processes controlled by the local control system. For example, physical aspects can be acquired from Italy on a ten minute cycle, acquired from Sudan on a one minute cycle, and acquired from South Africa on a five second cycle.

In operation 310, the system 100 uses industry standard protocols, such as object linking and embedding for process control (OPC) unified architecture (UA), to collect or pull process information (timestamped values) from distributed sites. The data is converted into an application internal data format and uploaded into the cluster via a communication layer. The collector might hereby even be directly installed on-site as well.

In operation 315, the system 100 uses a communication layer to temporarily persist the ingested data and make the data available in a fault tolerant way for further processing.

In operation 320, the distributed applications use subscription mechanisms capable of handling one or more subscriptions. The applications or can be seen as the workhorse analytical projects can be assigned to and executed based on real-time data received from the communication layer. The communication layer allows a loose coupling of parts of the system or workflow.

In operation 325, the system 100 uses a backend 345 to act as one participant of the communication layer and receive analytical results. In addition, the backend 345 acts as a backend for the presentation layer and to forward projects to be executed to the cluster. The backend 345 is a software application for controlling and taking measurement data used for graphic display of data, measurement processing, data logging, producing visual representations of the data, and connecting additional device during active measurements.

In operation 330, the system 100 presents the analytical results via a frontend. Raw values can be used in the frontend to create analytical models.

In operation 335, the system 100 provides the user (e.g. engineers in a RDC) the ability to create analytical models using the presentation layer or GUI and interpret analytical results.

In operation 340, the system 100 derives further actions based on the results forwarded to them to on-site operators.

Although FIG. 3 illustrates an example process for the application over 300, various changes could be made to FIG. 3. For example, while shown in a series of steps, various steps could overlap, occur in parallel, occur in a different order or occur multiple times.

FIG. 4 illustrates an exemplary topology 400 for analytical projects according to the various embodiments of the present disclosure. For example, the topology 400 depicted in FIG. 4 may be performed by a data processing system 100 illustrated in FIG. 1.

An analytical project 405, 406 contains input signals 410 and output signals 415 connected in a project 405, 406 to various, user-definable, function blocks 420. A project 405, 406 in monitoring mode is fed with real-time data as input signals 410 and generates user definable outputs as output signals 415.

The function block 420 can serve different purposes. For example a computer sensor function block 420 forms an output signal 415 by applying a mathematical expression. For example, $s3=s1+s2$, where s3 is the output signal 415 of the function block 420, s1 is a first input signal 410, and s2 is a second input signal 410.

A rule function block 420 compares the input signal 410 to a defined value and sets a binary I/O depending on whether the expression is true or false. This binary value can be used to raise alarms to the REC engineer.

A support vector machine (SE) function block 420 is a complex function block 420. The SE function block 420 maps a set of input signals into a higher dimensional space to classify the current function block input vector (FBIV), comprised by the input signals 410. The SE function block 420 computes the deviation from a trained behavior. The SE function block 420 is used to signal a deviation of an expected or trained behavior of an asset based on real-time data and to subsequently raise alarms to the REC engineer.

Although FIG. 4 illustrates an example process for the topology 400 of an analytical project, various changes could be made to FIG. 4. For example, while shown in a series of steps, various steps could overlap, occur in parallel, occur in a different order or occur multiple times.

Figure 5:
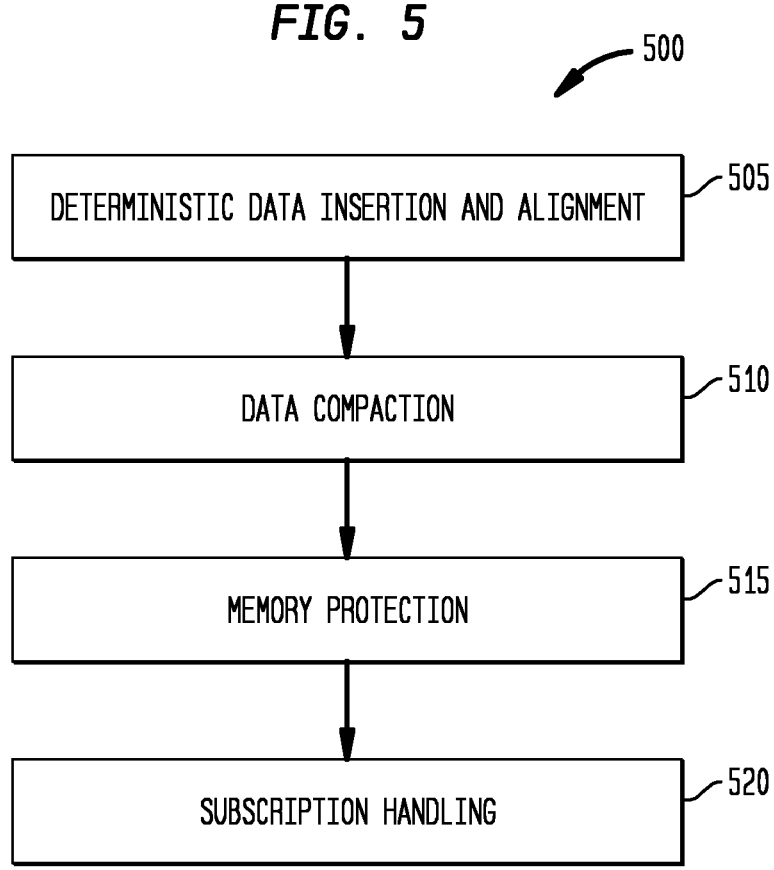
FIG. 5 illustrates an exemplary process for subscription handling and in-memory data alignment of unsynchronized real-time data streams according to the various embodiments of the present disclosure.

FIG. 5 illustrates an exemplary process 500 for subscription handling and in-memory data alignment of unsynchronized real-time data streams according to the various embodiments of the present disclosure. For example, the process depicted in FIG. 5 may be performed by a data processing system 100 illustrated in FIG. 1.

A subscription can be created by any entity including projects, databases, etc. For simplicity, the discussion is related to a project.

In operation 505, the system 100 performs deterministic data insertion and alignment. Two main components include subscription insertion and data insertion. The system 100 receives a subscription containing a signal identifier and unsynchronized data. The system 100 detects if the unsynchronized data for an ACT timestamp has completely arrived. The system 100 aligns the unsynchronized data in predefined time slots.

Subscription insertion includes identifying a set of signals from projects 602, which contains the function blocks of the analytical model. A subscription 630 is inserted into the flow and the SIV is added to the input vector (IV) of the subscription input vector (SIV). The values of the XIV are received from the communication framework and provided to the subscriptions as SIVs.

Subscription insertion includes the system 100 receiving a subscription 630 to be handled. The SIV is extracted from the subscription description. For each signal in the SIV, a new entry in the mapping mechanism 625 is created when the entry does not already exist in the mapping mechanism 625. The usage counter 629 is set to '1' and incremented upon receiving a signal identifier 641 matching the signal reference 626. Corresponding bits in a bit field 605 are set based on the column number assigned to the signal reference 626 of the SIV. An execution action is created during registering a subscription and a corresponding handler/callback is created by the subscriber. In case of project execution being the subscriber, by analyzing the project to be monitored a function block execution graph is created and executed when the callback is called The entry with a lowest timestamp (first leaf from the bottom up containing a reference=first row) in the tree is set as an initial starting point for handling of the subscription. The execution action, first row reference and the column selector are wrapped and inserted into the subscription handling list 635.

Data insertion includes the system 100 receiving a data point 640 comprising an ATM timestamp 615, the signal identifier 641, and a measured value 642. Using the signal identifier 641, the corresponding column for the signal 626 is retrieved from the mapping mechanism 625. By following a strict rule (e.g. "0" equals go right, "1" equals go left) while descending the binary tree 620, the leaf node is determined representing a specific timestamp 615. The binary representation of the timestamp 615 is used starting from the most significant bit (MSB). Each layer connection corresponds to the appropriate bit in the timestamp 615. Therefore the timestamp of a particular row is encoded in the tree itself and can be recovered by following a specific path descending from the root to a leaf node and appending the reference name to the binary representation of the timestamp. Ascending the binary tree 620 means decreasing the time resolution. Sibling leaf nodes represent ascending (right of the current timestamp if tree is viewed root node on top, leaves at the bottom) and then descending (left of the current timestamp if the tree is viewed root node on top, leaves at the bottom). When a leaf contains a reference to a row, the referenced row is used for the data insertion. If no referenced row is found, the surrounding leafs of the current node are checked based on a maximum search distance (e.g. +/−100 ms) whether they already contain a row reference or not, as ATM timestamps 615 may contain a jitter due to in-field acquiring inaccuracies. The search radius contains the same maximum amount of nodes (search radius) and ascends/descends to reach the nodes for each search. If a sibling leaf node is found, the sibling is used to insert the data point (bucketing). If no sibling is found in the search radius, a new row 610 is retrieved from the row pool 605 and the reference to the row 610 is added to the originally determined leaf node. When inserting a value 642 into the row 610 containing all values 642 for a specific ATM timestamp 641 (+/− the search radius), the corresponding bit in a cell 611 in a rows bitmask (valid mask) is set (atomic action). Data is only inserted into the row, when the corresponding bit in the bit mask is not already set to avoid overriding existing values. The row 610 corresponds to a predefined time slot.

In operation 510, the system 100 performs data compaction. Data compaction involves filling in data gaps that would otherwise not allow a subscription to advance due to lack of necessary data for serving the subscribed system. The data gaps could be caused by different measuring intervals at the field device, delay or loss of signal, loss of connectivity with a field device, etc. The gaps are created when a value is received with a later timestamp. The system 100 fills in the data gaps in the unsynchronized data for the ATM timestamp. The gaps can be filled using an immediately previous value, an average of all current values, an average of the immediately previous value and the immediately following value, interpolation, etc.

In operation 515, the system 100 performs memory protection. Memory protection is incorporated during a timeout or an overflow of data. A timeout occurs when a subscription is behind on its movement through the buffer e.g. because of missing data (waiting for data that never arrives). The system checks for when the current time is greater than a "last-moved-time" (LMT), set each time a subscription is moved to another row, plus a configurable timeout (actual timeout e.g. 60 s). The timeout can be a maximum allowed time for the subscription to wait for a row to complete, the timeout can be an average time allowed for the subscription to wait for a row to complete, etc. In case of a timeout, the system assigns the next row reference to the subscription for handling and sets the LMT to the current timestamp of the system 100. A cleanup mechanism returns all rows up to the position of the oldest subscription after each handling cycle.

An overflow occurs when the amount of rows exceeds the maximum allowed rows in the buffer window due to a subscription handling too slow or too fast insertion rates (subscriptions cannot keep up). The oldest rows, which are over the maximum amount of rows for a buffer window, are returned to the row pool to be used by the next data insertion. Projects having the returned rows assigned are moved to the new earliest row within the buffer window.

In operation 520, the system 100 performs subscription handling. All subscriptions 705 in the subscription handling list are continuously/cyclically checked whether they are able to be handled by comparing their stored column selector 710 and the current rows valid mask 715. This can be done by a binary AND operation. If the result of the AND operation does not match the columns of the stored column selector, the SIV is not complete yet and the subscription 705 is not to be handled. Once a SIV is complete, the SIV is provided to the subscribed domain and the actual module handling is performed e.g. via callback. The handling output is forwarded to further steps (e.g. sending the result to a communication framework). The next tree leaf node referencing a row is evaluated and the reference to that row is stored with the subscription in the subscription handling list.

Although FIG. 5 illustrates an example process 500 for subscription handling and in-memory data alignment of unsynchronized real-time data streams, various changes could be made to FIG. 5. For example, while shown in a series of steps, various steps could overlap, occur in parallel, or occur in a different order or occur multiple times.

For convenience of discussion in FIGS. 6-9, the value of "1" indicates that a value for the signal has been received, the value of "0" indicates that a value for the signal has not been received, and a value of "–" or a value of "0" followed by a "1" indicates a gap in the data.

Figure 6:
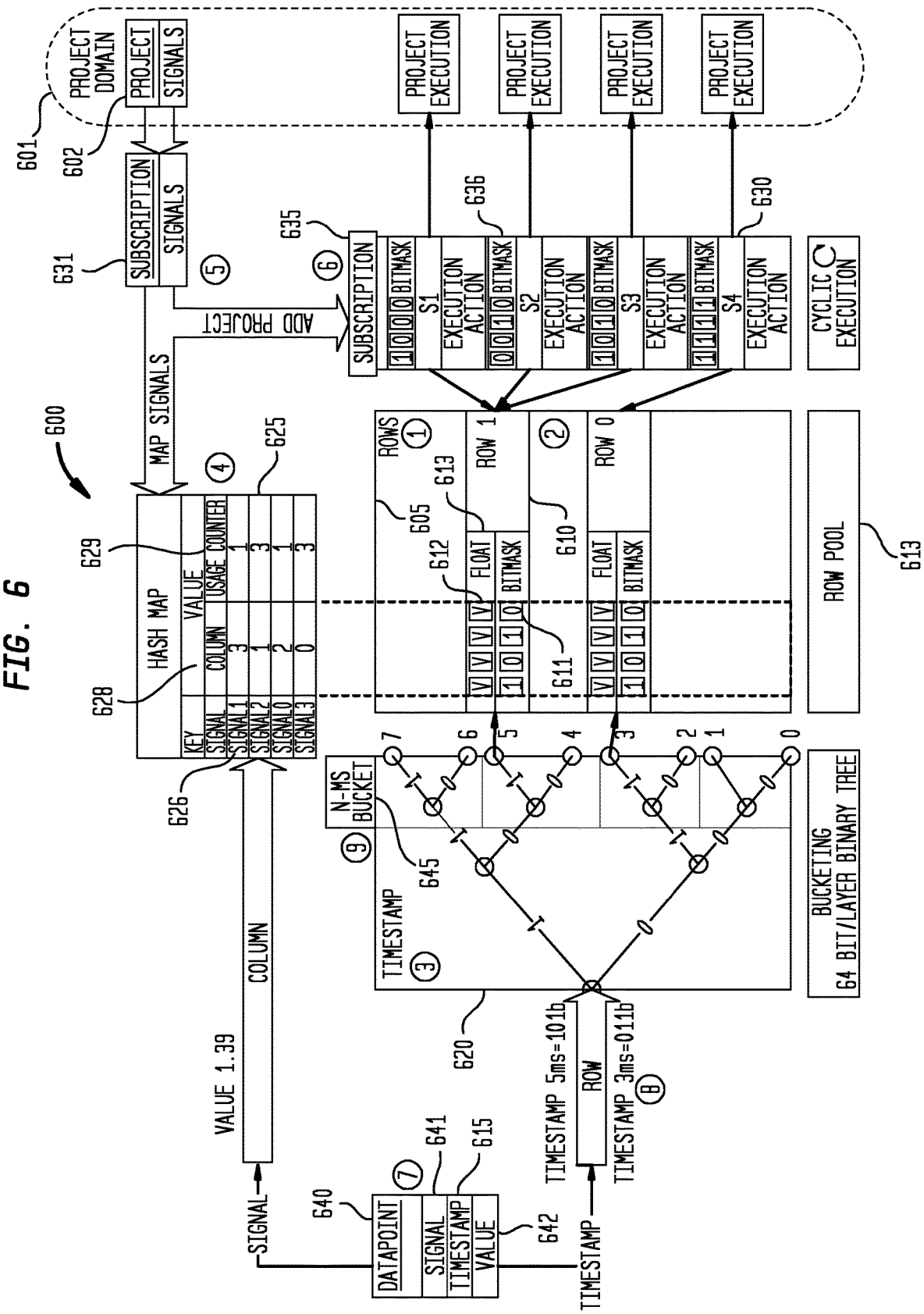
FIG. 6 illustrates an exemplary insert and alignment process according to the various embodiments of the present disclosure.

FIG. 6 illustrates an exemplary insert and alignment process 600 according to the various embodiments of the present disclosure. For example, the process depicted in FIG. 6 may be performed by a data processing system 100 illustrated in FIG. 1.

A project 602, such as the projects 400 or 401 illustrated in FIG. 4, from the project domain 601 creates a subscription 631 with the signals 626 that are required for execution of the project 602. A callback to the projects' execution module is stored with the subscription for identifying the appropriate project 601 in the project domain 601 upon receiving a full row 610 of signals 626 for a timestamp 615.

The subscription handling table 605 (XT) contains the values for all signals used by the subscriptions handled in a particular handling environment. One row 610 in the XT 605 contains all data (values for one XIV 613) received for a particular ATM timestamp 615. It contains a fixed amount of slots for values (columns). A row 610 contains an array of actual values 612 as well as a bitmask signaling in cells 611 that a specific value is valid. A row pool 615 ensures rows 610 do not need to be created every time they are used.

The rows 610 are referenced by a data field 620 of leaf nodes of a binary tree. A binary tree is a programming construct where one node has only two children and the reference to those children are named "1" and "0". Starting with a first child of the binary representation of the timestamp, the row 610 is identified in which the data from the signal 626 is entered. To ensure deterministic insertion times this particular B-Tree does not make use of non-leaf nodes to store references.

The bit representation of the timestamp 615 (5 ms=$101b$) determines which child reference to follow by a shift and "AND" operation. Therefore, the timestamp 615 of a particular row 610 is encoded in the tree itself and can be recovered by following a specific path descending from the root to a leaf node and appending the reference name ("0"/"1") to the binary representation of the timestamp. For example, the timestamp 615 for 5 ms can be represented by $101b$, which following the binary tree would insert the data into the row referenced by the fifth leaf node (corresponding to 5 ms). Another example, the timestamp 615 for 3 ms can be represented by $011b$, which following the binary tree would insert the data into the row referenced by the third leaf node (corresponding to 3 ms). In above figure, the timestamp 615 has been shortened to four bit. In certain embodiments, a 64 bit timestamp 615 is used, which changes the tree to have 64 layers (one layer is the sum of all nodes of the same depth). Furthermore, the timestamp 615 has a millisecond resolution, but could be any resolution.

As it is unknown which signals are in the SIVs of a subscription before receiving a subscription and subscriptions can be added/removed dynamically, a mapping mechanism 625 is used to map a specific signal 626 to a column 627. As the subscription insertion is not time critical, a standard HashMap can be used as a mapping mechanism 625 to manage mapping the signals. A HashMap is a common construct (e.g. in JAVA) for maintaining key and value pairs using unsynchronized methods and allowing null value. An entry in this mapping mechanism 625 is identified by the signal name 626 (key). The value field contains the column number 628 as well as a usage counter 629, which is keeping track of how many subscriptions 630 are using a particular signal 626.

Added subscriptions 631 consist of the signals 626 previously extracted from, for example, a project for an execution action (e.g. a callback) to be executed whenever there is a complete SIV available. The signals 626 from the added subscriptions 631 are added to the mapping mechanism 625 and the subscriptions are added to a subscription list 635. Each time a signal 626 from a subscription 631 is added to the mapping mechanism 625, the usage counter 629 is accordingly incremented (decremented in case a subscription is removed).

All subscriptions 630 are kept in an unsorted subscription list 635 and contain a bitfield 636 identifying which signals 626 in a row 610 a particular subscription uses. In certain embodiments, the subscription list 635 contains the subscriptions 630 in the order that they are added. For example, the subscription list 635 includes subscriptions 630 P1, P2, P3, and P4. When the added subscription 631 is included in the subscription list 635, the added subscription 631 will become subscription P5.

Received data points 640 (data coming from site) comprise an ATM timestamp 615, the signal identifier 641 (e.g. the signal name) and the measured value 642. The received data point can be from a sensor in a field device or a processing system. The signal identifier 641 corresponds with the signal 626 in a subscription 630 and the key in the mapping mechanism 625 used to identify which column 628 the value 642 is to be entered.

By using the timestamp 615 and descending the binary tree 620 using the shift and "AND" mechanism, the correct row 610 can be identified. As discussed earlier, the binary value of the timestamp 615 is identified and processed through the binary tree 620 to identify the appropriate row 610 to enter the value 642.

As measured data across different sites is unsynchronized, a bucket 645 is used to determine the row 610 where a new data point is to be inserted. The bucket 645 is a proximity definition/radius used to search an already existing row around the time that the value is to be inserted.

Although FIG. 6 illustrates an example insert and alignment process 600, various changes could be made to FIG. 6. For example, while shown in a series of steps, various steps could overlap, occur in parallel, occur in a different order or occur multiple times.

Figure 7:
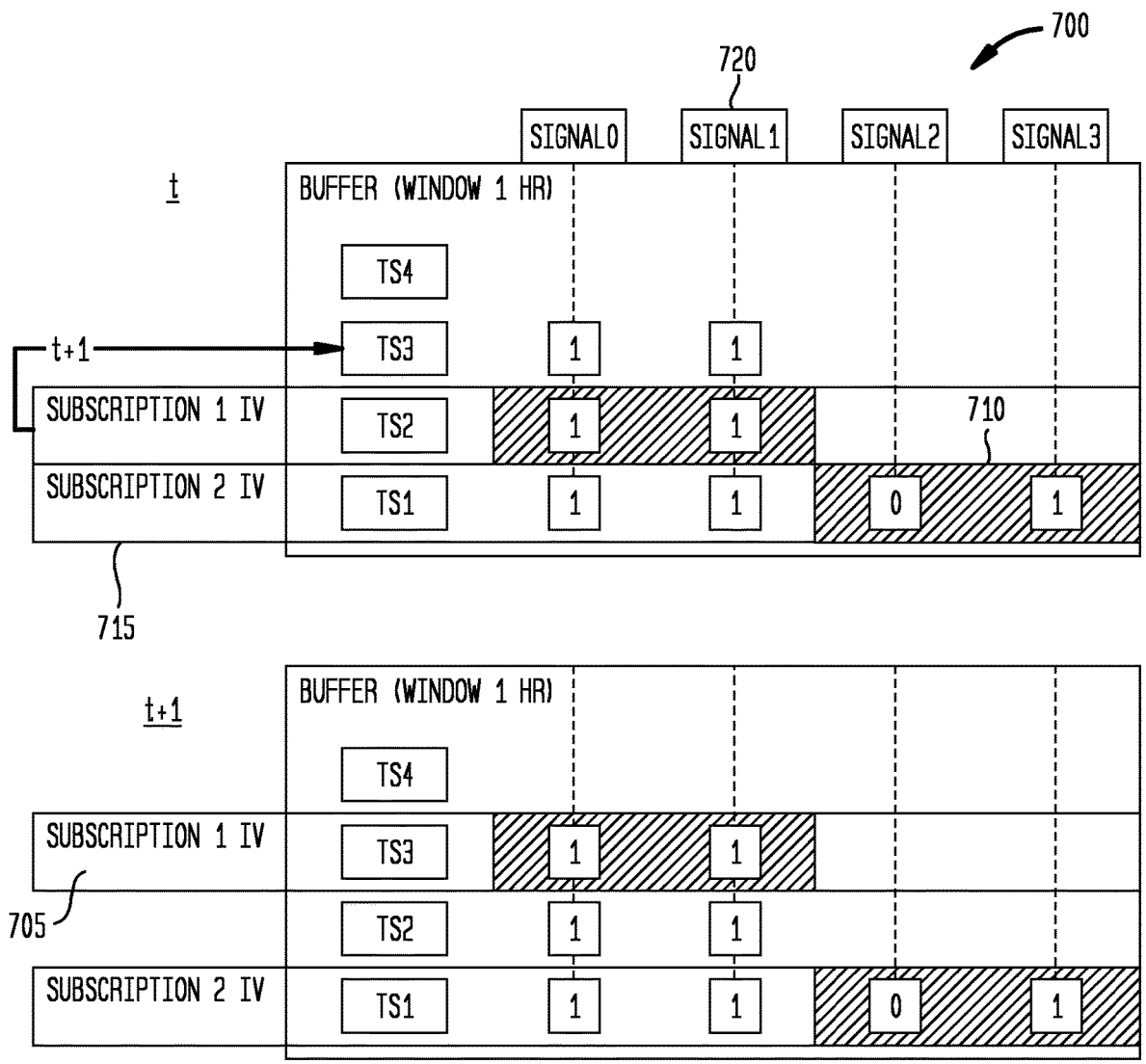
FIG. 7 illustrates an exemplary subscription handling process according to the various embodiments of the present disclosure.

FIG. 7 illustrates an exemplary subscription handling process 700 according to the various embodiments of the present disclosure. For example, the process depicted in FIG. 7 may be performed by a data processing system 100 illustrated in FIG. 1.

All subscriptions 705 in the subscription handling list are continuously checked whether they are able to be handled or not by comparing their stored column selector 710 and the current rows valid mask 715. This can be done by a binary AND operation. If the result of the AND operation does not equal the columns in the column selector, the SIV is not complete yet and the subscription 705 is not to be handled. Once a SIV is complete, the SIV is provided to the subscribed domain and the actual module handling is performed e.g. via callback.

The handling output is forwarded to further steps (e.g. sending the result to a communication framework). The next sampling node containing a row is evaluated and the reference to that row is stored with the subscription in the subscription handling list. The column selector 710 identifies the columns that apply for the subscription. As indicated earlier, multiple subscriptions 705 can include values from a signal 720. For example, Project 1 is illustrated as requiring signals 0 and 1 for handling and Project 2 is illustrated as requiring signals 2 and 3 for handling. In certain embodiments, signal 1 could be required for both Project 1 and Project 2, and the column selector would be extended to also include signal 1 for Project 2. The subscription column selector 710 identifies the signals of a row 510 the subscription is using. For example, Project 1 at time "t" is on the row corresponding to "TS2." The column selector 710 indicates that Signals "0" and "1" are required for handling, which are available at time "t." At time "t+1," the current row of subscription 1 shifts to the row corresponding to "TS3." Because signal 2 has not been valid, indicated by a "0" of the XIV valid bitmask, at time "t," Project 2 does not advance to the next row corresponding to "TS2."

Although FIG. 7 illustrates an example subscription handling process 700, various changes could be made to FIG. 7. For example, while shown in a series of steps, various steps could overlap, occur in parallel, occur in a different order or occur multiple times.

Figure 8:
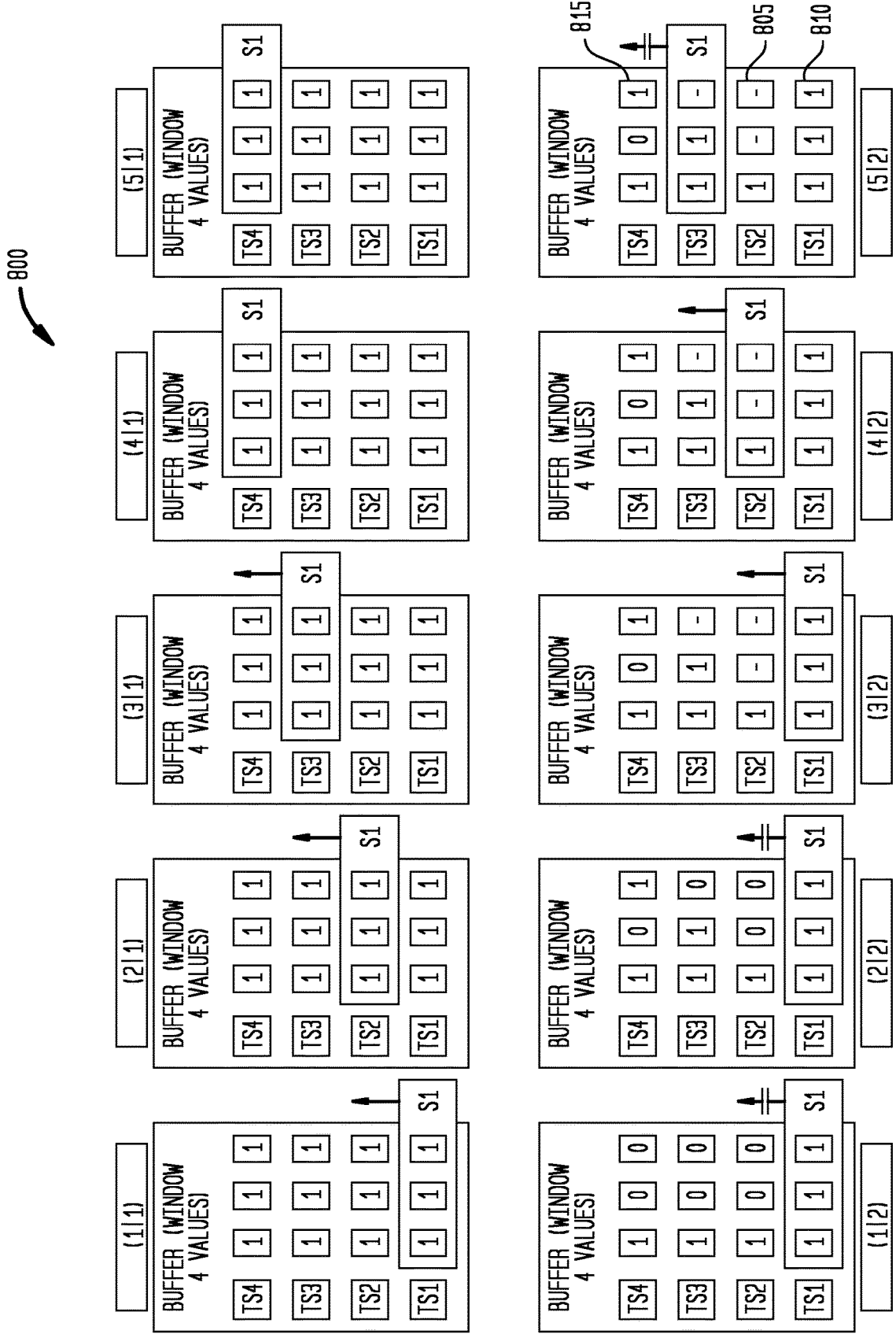
FIG. 8 illustrates an exemplary data compaction process according to the various embodiments of the present disclosure.

FIG. 8 illustrates an exemplary data compaction process 800 according to the various embodiments of the present disclosure. For example, the process depicted in FIG. 8 may be performed by a data processing system 100 illustrated in FIG. 1.

The top row of row pools illustrated in FIG. 8 shows the straight forward handling of a single subscription containing the complete XIV as SIV for easier explanation. The handling follows the one described in relation to FIG. 7. Each row for the subscription is checked for valid data and, as illustrated in the top row, the subscription advances upon determining each row is completely received.

However, situations can occur when, for one row, signals are included that for various reasons have not received valid data points for every timestamp, as illustrated in the bottom row of FIG. 8. Reasons for the lack of a received value could be different, including sampling intervals of the in-field data, connection loss, etc. In these situations, a mechanism called compaction starts filling the "gaps" 805 between an earlier value 810 and a later value 815 by propagating historical values, average values, interpolated values, or other values as described herein, to the "gaps" 805 to create valid and able to be handled SIVs. An additional row is used for the compaction containing valid mask and values. A compaction run preferably starts with the very first value available in the data table and moves upwards in regards to the timestamp. A compaction run is generally only to be performed up to the lowest of all newest and valid timestamps (horizon) as it is anticipated that once a value with a higher timestamp is received, gaps will not be closed anymore.

Example for calculating the horizon based on FIG. 8:

| (1 \| 2) | min(max(S0), max(S1), max(S3)) = <br> min(max(TS1, TS2, TS3, TS4), max(TS1), max(TS1)) = <br> min(TS4, TS1, TS1) = <u>TS1</u> |
| (2 \| 2) | min(max(S0), max(S1), max(S3)) = <br> min(max(TS1, TS2, TS3, TS4), max(TS1, TS3), <br> max(TS1, TS4)) = <br> min(TS4, TS3, TS4) = <u>TS3</u> |

First, copy valid values of the actual row to the compaction row by using the valid vectors (binary operations). Next, copy all valid values of the compaction row to the actual row. Finally, move to the next row or stop when horizon is reached.

Example using the based on FIG. 8:

| (1 \| 2) | Signal 1 and Signal 2 are missing <br> →The subscription is not able to be handled |
| (2 \| 2) | Signal 1 and Signal 2 arrived but gap at (Signal 1, TS2) and (Signal 2, TS2 & TS3) |
| (3 \| 2) | Compaction: <br> Propagate or copy old values (TS1) into the future (TS2) <br> →Gap at (Signal 1 & Signal 2, TS2) filled by (Signal 1 & Signal 2, TS1), Gap at (Signal 2, TS3) |
| (4 \| 2) | Propagate old values (Signal2, TS2) into the future (TS3) Gap at (Signal 2, TS3) filled by (Signal 2, TS2) |
| (5 \| 2) | Continue handling till TS3 (as T3 is the horizon/oldest of the last received data points) |

Although FIG. 8 illustrates an example data compaction process 800, various changes could be made to FIG. 8. For example, while shown in a series of steps, various steps could overlap, occur in parallel, occur in a different order or occur multiple times.

Figure 9:
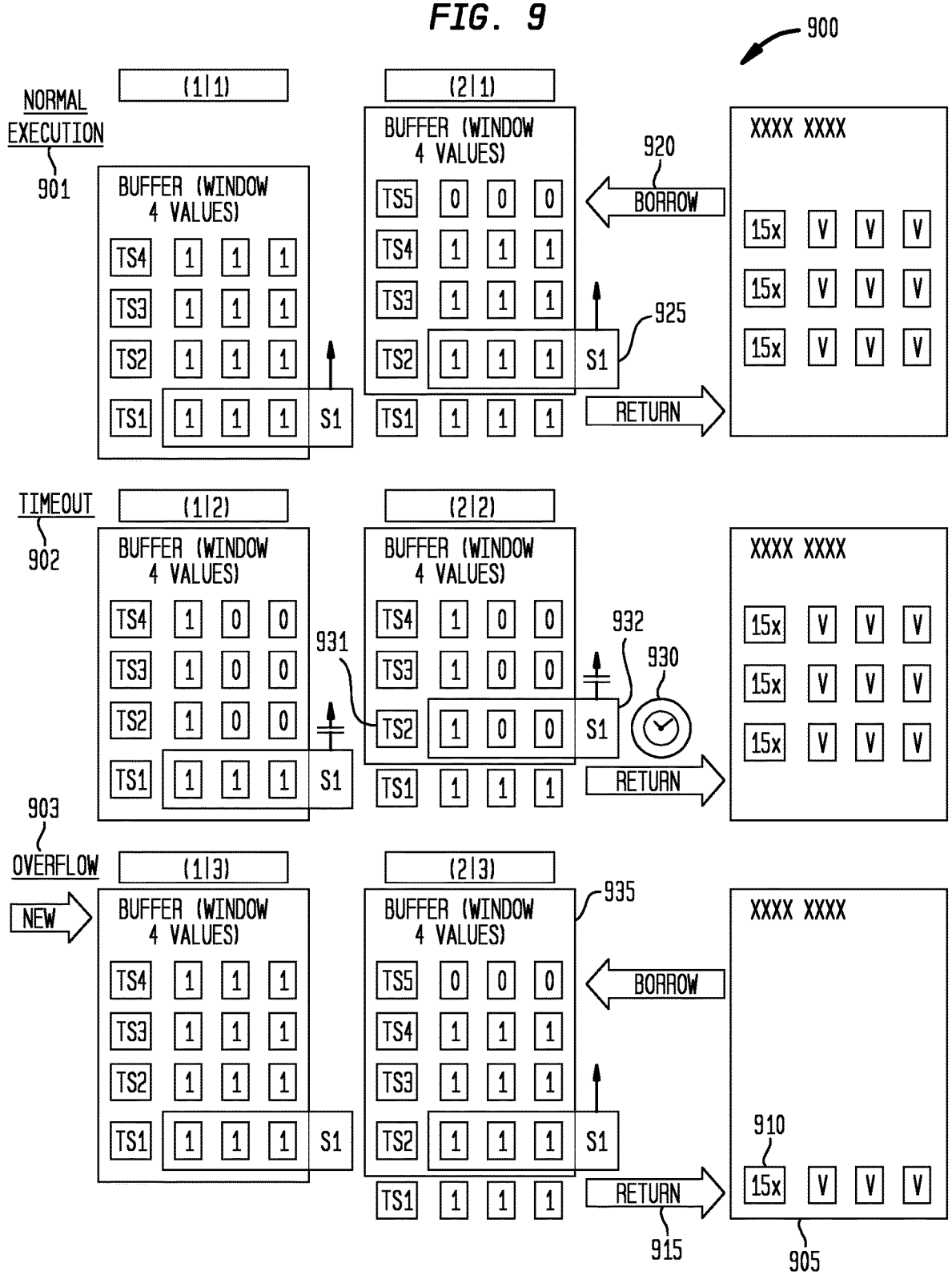
FIG. 9 illustrates an exemplary memory and consistency protection process according to the various embodiments of the present disclosure.

FIG. 9 illustrates an exemplary memory and consistency protection process 900 according to the various embodiments of the present disclosure. For example, the process depicted in FIG. 9 may be performed by a data processing system 100 illustrated in FIG. 1.

To enforce a consistent memory usage due to repetitive memory allocation, a row pool 905 is used to provide and manage rows 910. When returning 915 a row 910, the pool clears the valid bit mask and the row 910 can be reused.

During normal handling 901, rows 910 get handled fast enough and the row pool 905 has enough rows to serve requests. Whenever is row 910 is completed and used for handling subscriptions, the row 910 can be returned 915 and a new row 910 can be borrowed 920.

During a timeout 902, each subscription 925 stores the time of its last movement. If a timeout 902 (now>=time of last movement+fixed duration) occurs, the subscription 925 is automatically moved to the next available row 931. A cleanup mechanism 930 returns all rows 910 up to the position 932 of the oldest subscription after each handling cycle.

During an overflow 903, data is ingested faster than the subscriptions 925 can handle. In overflow 903 situations, the buffer window 935 containing a predefined maximum amount (e.g. 20,000) of rows 910 (cap memory consumption) moves forward and the lower bound of the buffer window 935 forces all subscriptions 925 at this position to move one row. Once all subscriptions 925 are moved, the oldest row(s) 910 are returned to the row pool 905 to enable newer values to be inserted upfront.

Although FIG. 9 illustrates an example memory and consistency protection process 900, various changes could be made to FIG. 9. For example, while shown in a series of steps, various steps could overlap, occur in parallel, occur in a different order or occur multiple times.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for subscription handling and in-memory alignment of unsynchronized real-time data streams and comprising:
    receiving a subscription comprising a signal identifier, the signal identifier being associated with a value that is required for handling the subscription;
    receiving unsynchronized data points, each data point comprising an actual time of measurement (ATM) timestamp, the signal identifier and the value;
    handling the subscription using the unsynchronized data points by:
        aligning the unsynchronized data points in predefined time slots, the predefined time slots comprising masks, wherein a first predefined time slots comprises first values of the unsynchronized data points for a first ATM timestamp and a first mask for validation of the first values of the first ATM timestamp;
        executing the subscription using the first values of the first ATM timestamp; and
        returning the first predefined time slot to a memory pool for usage as a second predefined time slot for unsynchronized data points of a second ATM timestamp.

2. The method of claim 1, wherein the signal identifier indicates signals required for handling the subscription.

3. The method of claim 1, wherein the predefined time slots comprise cells, and wherein the ATM timestamp and the signal identifier are used to deterministically find a column and a row identifying a cell for insertion.

4. The method of claim 1, wherein handling the subscription further comprises:
    when a timeout is detected:
        moving the subscription to a next available row, and
        returning unhandled rows to a position of an oldest subscription after each cycle.

5. The method of claim 1, wherein handling the subscription further comprises:
    when an overflow is detected:
        moving the subscription to an earliest row within a buffer window; and
        returning rows outside the buffer window to the memory pool.

6. The method of claim 1, wherein handling the subscription further comprises:
    filling in a data gap in the first predefined time slot for the first ATM timestamp in response to missing valid first values such that the first mask of the first predefined time slot indicates that the first values are valid.

7. The method of claim 6, further comprising detecting the data gap when a later value corresponding to a later ATM timestamp is received, and
    wherein filling in the data gap comprises inserting a value corresponding to one of: an immediately previous value, an average of all values, an interpolated value, or an average of the immediately previous value and an immediately following value, for a signal where the data gap is detected.

8. A data processing system comprising:
    an accessible memory; and
    a processor coupled to the accessible memory, the processor configured to:
        receive a subscription comprising a signal identifier, the signal identifier being associated with a value that is required for handling the subscription;
        receive unsynchronized data points, each data point comprising an actual time of measurement (ATM) timestamp, the signal identifier and the value,
        handle the subscription using the unsynchronized data points:
            align the unsynchronized data points in predefined time slots, the predefined time slots comprising masks, wherein a first predefined timeslot comprises first values for a first ATM timestamp and a first mask for validation of the first values of the first ATM timestamp;
            execute the subscription using the first values of the first ATM timestamp; and
            return the first predefined time slot to a memory pool for usage as a second predefined timeslot for unsynchronized data points of a second ATM timestamp.

9. The data processing system of claim 8, wherein the signal identifier indicates signals required for handling the subscription.

10. The data processing system of claim 8, wherein the predefined time slots comprise cells, and wherein the ATM timestamp and the signal identifier are used to deterministically find a column and a row identifying a cell for insertion of a value.

11. The data processing system of claim 8, wherein to handle the subscription further comprises:
    when a timeout is detected, the processor is further configured to:
        move the subscription to a next available row, and
        return unhandled rows to a position of an oldest subscription after each cycle.

12. The data processing system of claim 8, wherein to handle the subscription further comprises:
    when an overflow is detected, the processor is further configured to:
        move the subscription to an earliest row within a buffer window; and
        return rows outside the buffer window to the memory pool.

13. The data processing system of claim 8, wherein to handle the subscription further comprises to fill in a data gap in the first predefined time slot for the first ATM timestamp in response to missing valid first values such that the first mask of the first predefined time slot indicates that the first values are valid.

14. The data processing system of claim 13, wherein the processor is further configured to detect the data gap when a later value corresponding to a later ATM timestamp is received,
    wherein to fill in the data gap comprises to insert a value corresponding to one of: an immediately previous value, an average of all values, an interpolated value, or an average of the immediately previous value and an immediately following value, for a signal where the data gap is detected.

15. A non-transitory computer-readable medium encoded with executable instructions that, when executed, cause a processor to:
    receive a subscription comprising a signal identifier, the signal identifier being associated with a value that is required for handling the subscription;
    receive unsynchronized data points, each data point comprising an actual time of measurement (ATM) timestamp, the signal identifier and the value,
    handle the subscription using the unsynchronized data points:

align the unsynchronized data points in predefined time slots, the predefined time slots comprising masks, wherein a first predefined timeslot comprises first values for a first ATM timestamp and a first mask for validation of the first values of the first ATM timestamp;

execute the subscription using the first values of the first ATM timestamp; and return the first predefined time slot to a memory pool for usage as a second predefined timeslot for unsynchronized data points of a second ATM timestamp.

16. The non-transitory computer-readable medium of claim 15, wherein the signal identifier indicates signals required for handling the subscription.

17. The non-transitory computer-readable medium of claim 15, wherein the predefined time slots comprise cells, and wherein the ATM timestamp and the signal identifier are used to deterministically find a column and a row identifying a cell for insertion of a value.

18. The non-transitory computer-readable medium of claim 15, wherein to handle the subscription further comprises:

when a timeout is detected, the processor is further configured to:

move the subscription to a next available row, and return unhandled rows to a position of an oldest subscription after each cycle.

19. The non-transitory computer-readable medium of claim 15, wherein to handle the subscription further comprises to fill in a data gap in the first predefined time slot for the first ATM timestamp in response to missing valid first values such that the first mask of the first predefined time slot indicates that the first values are valid.

20. The non-transitory computer-readable medium of claim 19, wherein the instructions further cause the processor to detect the data gap when a later value corresponding to a later ATM timestamp is received, and wherein to fill in the data gap comprises to insert a value corresponding to one of: an immediately previous value, an average of all values, an interpolated value, or an average of the immediately previous value and an immediately following value, for a signal where the data gap is detected.

* * * * *